(12) United States Patent
Hürtgen et al.

(10) Patent No.: US 6,246,174 B1
(45) Date of Patent: Jun. 12, 2001

(54) DEVICE FOR CONTROLLING THE BRIGHTNESS OF AN INSTRUMENTATION LIGHT OF AN AUTOMOBILE

(75) Inventors: Bernd Hürtgen, Sibbesse; Werner Pöchmüller, Hildesheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/529,283

(22) PCT Filed: Oct. 9, 1998

(86) PCT No.: PCT/DE98/02988

§ 371 Date: Jul. 17, 2000

§ 102(e) Date: Jul. 17, 2000

(87) PCT Pub. No.: WO99/19167

PCT Pub. Date: Apr. 22, 1999

(30) Foreign Application Priority Data

Oct. 10, 1997 (DE) .............................. 197 44 922

(51) Int. Cl.[7] .................................... B60Q 1/26
(52) U.S. Cl. ............... 315/77; 315/155; 315/308; 250/214 AL; 364/424.033; 364/424.094; 340/461
(58) Field of Search ............... 315/82, 83, 155, 315/291, 77, 308; 250/214 AL, 214 L, 214 RC; 364/424.019, 424.033, 424.094; 340/469, 500, 525, 942, 461

(56) References Cited

U.S. PATENT DOCUMENTS

| | | | |
|---|---|---|---|
| 4,645,975 | * 2/1987 | Meitzler et al. | 315/82 |
| 4,970,653 | 11/1990 | Kenne | 364/461 |
| 5,583,484 | 12/1996 | Asano | 340/461 |
| 5,796,094 | * 8/1998 | Schofield et al. | 250/208.1 |
| 6,020,704 | * 2/2000 | Buschur | 318/483 |
| 6,107,787 | * 8/2000 | Wand | 323/299 |

FOREIGN PATENT DOCUMENTS

| | | |
|---|---|---|
| 32 45 299 | 6/1984 | (DE) . |
| 43 05 446 | 8/1994 | (DE) . |
| 44 09 777 | 9/1995 | (DE) . |
| 2 702 045 | 9/1994 | (FR) . |
| 60-240545 | 11/1985 | (JP) . |

* cited by examiner

*Primary Examiner*—Haissa Philogene
(74) *Attorney, Agent, or Firm*—Kenyon & Kenyon

(57) ABSTRACT

A device for controlling the brightness of dashboard lights in a motor vehicle is described, where an optoelectric receiver adjusts the light intensity of the dashboard lights with the output signal as a function of ambient brightness. To obtain an automatic measurement of the ambient brightness distribution in the direction of vehicle travel, taking into account the brightness in certain regions in the vicinity of the vehicle, an image sensor pointing in the direction of vehicle travel is provided as an optoelectric receiver to perform a location-selective absolute brightness measurement, and its electric output signal, weighted with preselected or preselectable algorithms for determining ambient brightness by an analyzer unit, so it can be sent to a control unit to influence the brightness of the dashboard lights.

3 Claims, 3 Drawing Sheets

DEVICE FOR CONTROLLING THE BRIGHTNESS OF AN INSTRUMENTATION LIGHT OF AN AUTOMOBILE

BACKGROUND INFORMATION

The present invention relates to a device for controlling the brightness of dashboard lights in a motor vehicle, in which an electro-optical transducer aligned in the direction of travel changes the light intensity of the dashboard lights, using the output signal, as a finction of the ambient brightness in front of the vehicle, and the output signal of the electro-optical transducer, which is weighted by an evaluation unit using predefined algorithms, being supplied to a control unit for influencing the brightness of the dashboard lights.

A device for controlling the brightness of dashboard lights is described in German Published Patent Application No. 32 45 299. In this case, a photodetector is used as an electro-optical transducer, which is joined to the windshield of the motor vehicle by a fiber-optic guide. In this manner, the photodetector detects the brightness of the ambient range in front of the motor vehicle. The output signal of the photodetector, which is weighted by a microprocessor using predefined algorithms, is supplied to a control unit for changing the brightness of the dashboard lights. The brightness of the ambient range in front of the motor vehicle is only approximately monitored by this device, meaning that the change in brightness of the dashboard lights is inadequate, especially when there are objects driving ahead or objects located in the ambient range.

A similar device having a phototransistor as an electro-optical transducer is described in German Published Patent Application No. 44 09 777. The analog output signal of the phototransistor is converted into a digital signal, and the characteristic curve of the phototransistor is compensated for by a processing device in such a manner, that a signal proportional to the ambient brightness is acquired for changing the brightness of the dashboard lights.

Japanese Laid-Open Patent No. 60 24 0545 describes a device for automatically switching the headlights of a vehicle on and off, when it drives into and out of a tunnel. In this case, the change in the brightness in front of the vehicle is monitored using an image-processing sensor, e.g. a CCD camera, and the change is used by an evaluation and control unit for switching the headlights.

A CCD camera for controlling the brightness of the dashboard lights is not suitable as an electro-optical transducer, since the CCD camera has a small dynamic range and does not allow an absolute determination of brightness. An absolute determination of brightness would only be attainable by aperture and illumination-time regulation, which, however, can never be exactly determined.

SUMMARY OF THE INVENTION

An object of the present invention is to provide a device in which the absolute ambient brightness in front of the motor vehicle is detected and used for optimally adjusting the brightness of the dashboard lights.

This object is achieved by the present invention, in that a logarithmic CMOS image-processing sensor used as an electro-optical sensor and having a non-linear conversion characteristic, decreases with increasing incident light.

An extreme dynamic range is achieved by this new image-processing sensor having a non-linear conversion characteristic, which will allow a large brightness range to be imaged in a technically limited voltage or current range.

In this context, the output signal of the image-processing sensor can also be weighted using suitable object-detection algorithms. For example, this can prevent a truck painted in a dark color from causing the ambient-brightness signal to be too small. Additional sensors (Lidar Radar) can also acquire information about an object, which is supplied to the evaluating unit and used in the above-described manner for controlling the brightness of the dashboard lights.

Figure 1:
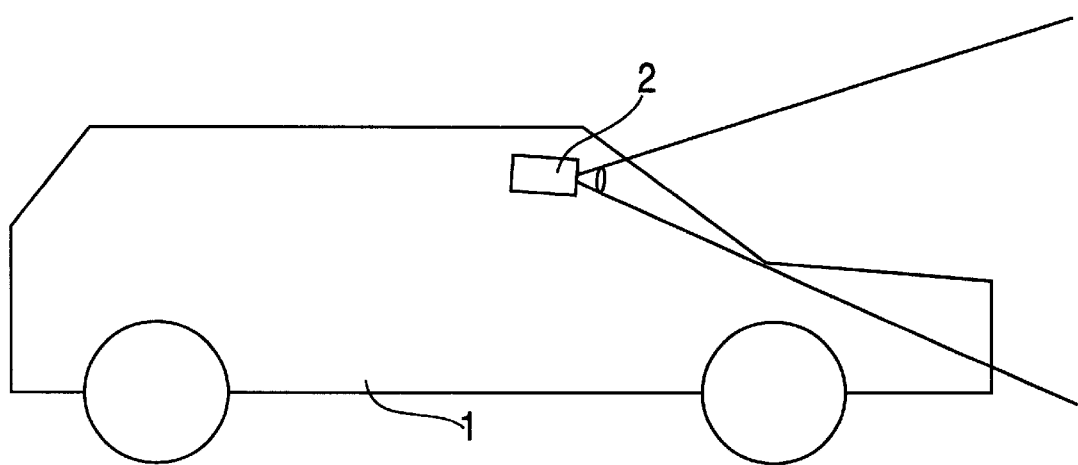
FIG. 1 shows a section along the longitudinal axis of the motor vehicle with the positioning of the image sensor.
Figure 2:
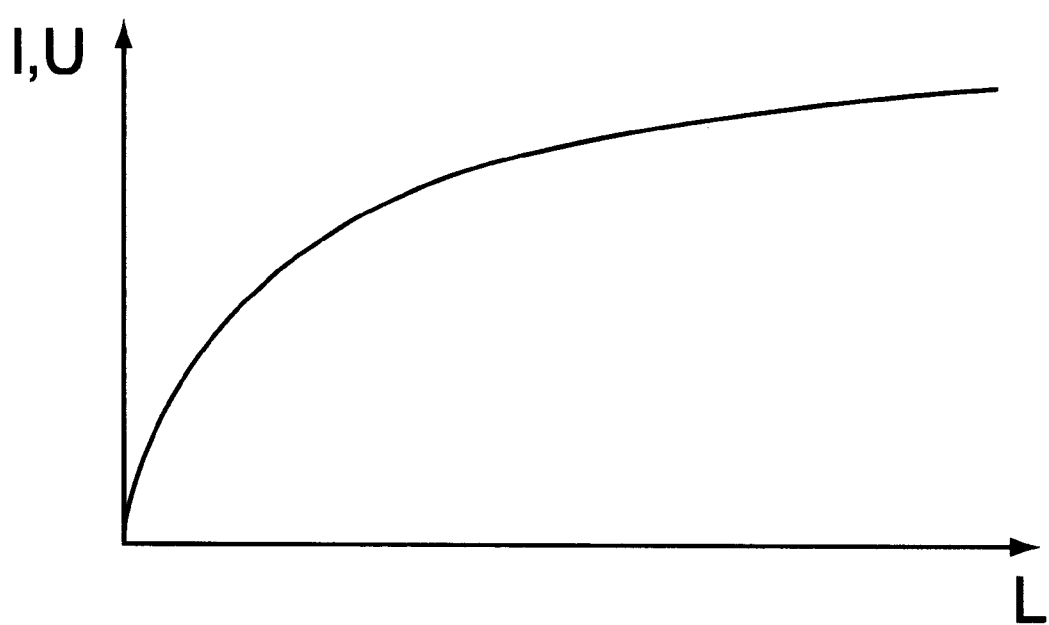
FIG. 2 shows the nonlinear conversion characteristic of the image sensor.
Figure 3:
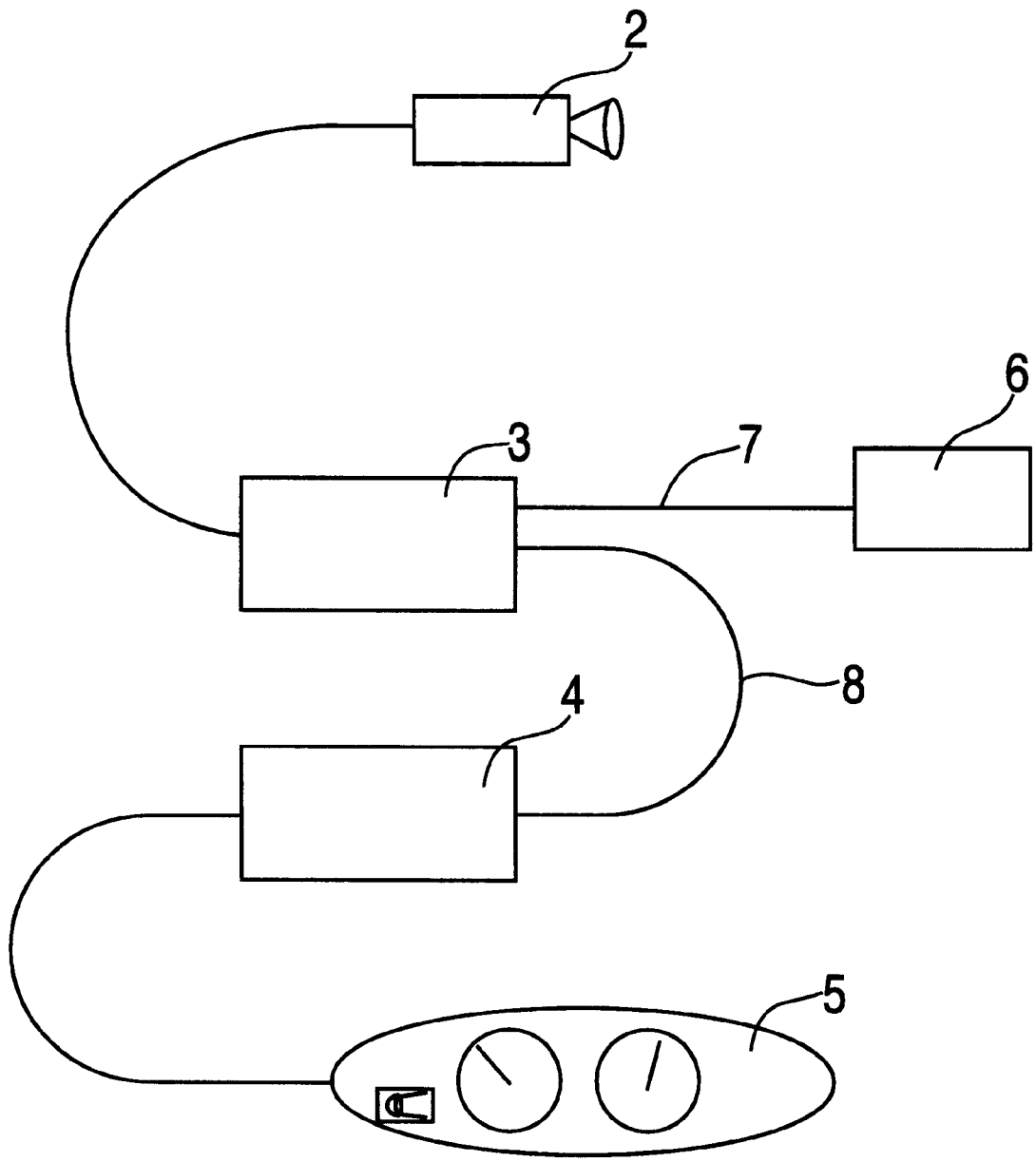
FIG. 3 shows a block diagram of the device for controlling the brightness of the dashboard lights An image sensor 2 (camera) is arranged in the interior of a motor vehicle 1 in the upper area behind the windshield. The space behind the rearview mirror (not shown) which is mounted in this area is preferably used for this purpose. Image sensor 2 points in the direction of vehicle travel and detects the conical traffic zone in front of motor vehicle 1 as indicated. Image sensor 2 is composed of multiple individual sensors for measuring the absolute brightness of the detected traffic zone in a location-selective manner.

As FIG. 2 shows, image sensor 2 has a nonlinear conversion characteristic. With an increase in light signal L, there is also an increase in voltage U or current I delivered, but slope $\Delta U/\Delta L$ or $\Delta I/\Delta L$ decreases. This leads to implementation of a highly dynamic image sensor 2. With a technically limited voltage or current range, a large brightness range can be imaged. It is especially advantageous to use an image sensor with a logarithmic conversion characteristic, because then the contrast resolution is constant over a brightness range of multiple decades.

Image sensor 2 supplies an electric "surface" image signal to an analyzer unit 3 which analyzes the image signal with the goal of measuring the ambient brightness. The ambient brightness signal or a dashboard brightness signal derived from it is relayed over a bus line 8 to a control unit 4 which controls dashboard lights 5. Analyzer unit 3 can weight the image signal of image sensor 2 according to preselected algorithms of object detection and use it for a suitably adjusted control of dashboard lights 5. Additional sensors 6 optionally provided for object detection or for other functions send additional information for adjusting the control signals for control unit 4 of dashboard lights 5 over a bus line 8 of analyzer unit 3. Sensors 6 may be used for object detection and for detection of the condition of the vehicle lighting.

What is claimed is:

1. A device for controlling a brightness of a dashboard light in a motor vehicle, comprising:
   an electro-optical transducer aligned in a direction of travel and for producing an output signal that changes a light intensity of the dashboard light as a function of an ambient brightness in front of the motor vehicle, wherein:
   the electro-optical transducer includes a logarithmic CMOS image-processing sensor having a non-linear conversion characteristic, and
   the CMOS image-processing sensor produces a decrease in the output signal of the electro-optical transducer as an increase occurs in an incident light signal;
   an evaluation unit for weighting the output signal of the electro-optical transducer in accordance with predefined algorithms; and a control unit supplied with the output signal of the electro-optical transducer for influencing the brightness of the dashboard light.

2. The device according to claim 1, further comprising:

a plurality of additional sensors for providing further information to the evaluation unit.

3. The device according to claim 1, wherein:

the CMOS image-processing sensor is positioned between a windshield of the motor vehicle and a rearview mirror mounted at a top of the windshield at a location approximately in a middle of the windshield.

* * * * *